(12) United States Patent
Torii et al.

(10) Patent No.: US 11,809,204 B2
(45) Date of Patent: Nov. 7, 2023

(54) UNMANNED AERIAL VEHICLE CONTROL SYSTEM, UNMANNED AERIAL VEHICLE CONTROL METHOD, AND PROGRAM

(71) Applicant: RAKUTEN GROUP, INC., Tokyo (JP)

(72) Inventors: Junji Torii, Tokyo (JP); Jun Takizawa, Chino (JP)

(73) Assignee: RAKUTEN GROUP, INC., Tokyo (JP)

( * ) Notice: Subject to any disclaimer, the term of this patent is extended or adjusted under 35 U.S.C. 154(b) by 457 days.

(21) Appl. No.: 16/636,030

(22) PCT Filed: Oct. 18, 2017

(86) PCT No.: PCT/JP2017/037675
§ 371 (c)(1),
(2) Date: Feb. 3, 2020

(87) PCT Pub. No.: WO2019/077694
PCT Pub. Date: Apr. 25, 2019

(65) Prior Publication Data
US 2020/0241571 A1  Jul. 30, 2020

(51) Int. Cl.
*G05D 1/10* (2006.01)
*B64C 39/02* (2023.01)
*G01S 19/42* (2010.01)
*G05D 1/08* (2006.01)
*B64U 10/13* (2023.01)

(52) U.S. Cl.
CPC ........... *G05D 1/106* (2019.05); *B64C 39/024* (2013.01); *G01S 19/42* (2013.01); *G05D 1/104* (2013.01); *B64U 10/13* (2023.01); *B64U 2201/10* (2023.01)

(58) Field of Classification Search
None
See application file for complete search history.

(56) References Cited

U.S. PATENT DOCUMENTS

| 2011/0295569 | A1 | 12/2011 | Hamke et al. |
| 2013/0204467 | A1* | 8/2013 | Spinelli ............... G08G 5/0039 701/3 |

(Continued)

FOREIGN PATENT DOCUMENTS

| JP | 2007-290647 A | 11/2007 |
| JP | 2011-246105 A | 12/2011 |

(Continued)

OTHER PUBLICATIONS

Office Action dated Jul. 16, 2019, for corresponding JP Application No. 2019-528773 and partial translation of the Office Action.

(Continued)

*Primary Examiner* — Aniss Chad
*Assistant Examiner* — Mahmoud M Kazimi
(74) *Attorney, Agent, or Firm* — HEA LAW PLLC

(57) ABSTRACT

An unmanned aerial vehicle (UAV) control system includes a first UAV, a second UAV that flies near the first UAV during a flight of the first UAV and is configured to obtain wind information about wind, and flight control means for controlling the flight of the first UAV based on the wind information obtained by the second UAV.

15 Claims, 8 Drawing Sheets

(56) References Cited

U.S. PATENT DOCUMENTS

| | | | |
|---|---|---|---|
| 2015/0379876 A1* | 12/2015 | Navot | ................... G05D 1/102 |
| | | | 701/301 |
| 2016/0196755 A1 | 7/2016 | Navot et al. | |
| 2017/0263136 A1 | 9/2017 | Navot et al. | |
| 2017/0334559 A1* | 11/2017 | Bouffard | .............. G08G 5/0034 |
| 2018/0040251 A1 | 2/2018 | Navot et al. | |
| 2018/0190133 A1 | 7/2018 | Navot et al. | |
| 2019/0005829 A1* | 1/2019 | Itabashi | ............... G08G 5/0034 |

FOREIGN PATENT DOCUMENTS

| | | |
|---|---|---|
| JP | 2017-519297 A | 7/2017 |
| JP | 2017-171014 A | 9/2017 |
| JP | 2017-171061 A | 9/2017 |
| JP | 2017-526566 A | 9/2017 |

OTHER PUBLICATIONS

International Search Report for PCT/JP2017/037675 dated Jan. 9, 2018 with its translation.

* cited by examiner

UNMANNED AERIAL VEHICLE CONTROL SYSTEM, UNMANNED AERIAL VEHICLE CONTROL METHOD, AND PROGRAM

CROSS REFERENCE TO RELATED APPLICATIONS

This application is a National Stage of International Application No. PCT/JP2017/037675 filed on Oct. 18, 2017. The contents of the above document is incorporated herein by reference in its entirety.

TECHNICAL FIELD

The present invention relates to an unmanned aerial vehicle control system, an unmanned aerial vehicle control method, and a program.

BACKGROUND ART

There are known techniques for controlling flight of an unmanned aerial vehicle (UAV). For example, Patent Literature 1 describes the techniques for estimating wind speed based on the modeled acceleration of the UAV and the actual acceleration detected by the UAV, and automatically controlling a trajectory of the UAV so as to compensate for trajectory deviations due to wind.

CITATION LIST

Patent Literature

[Patent Literature] JP2011-246105A

SUMMARY OF INVENTION

Technical Problem

However, in Patent Literature 1, the UAV is actually influenced by wind and then modifies the trajectory so as to counteract the influence of the wind. As such, flight control in response to changes in wind tends to be late.

One or more embodiments of the present invention have been conceived in view of the above, and an object thereof is to reduce delay in flight control in response to changes in wind.

Solution to Problem

In response to the above described issues, an unmanned aerial vehicle (UAV) control system according to the present invention includes a first UAV, a second UAV that flies near the first UAV during a flight of the first UAV and is configured to obtain wind information about wind, and flight control means for controlling the flight of the first UAV based on the wind information obtained by the second UAV.

A UAV control method according to the present invention includes a wind information obtaining step of obtaining wind information by a second UAV that flies near a first UAV during a flight of the first UAV and is configured to obtain the wind information about wind, and a flight control step of controlling the flight of the first UAV based on the wind information obtained in the wind information obtaining step.

A program according to the present invention causes a computer to function as flight control means for controlling a flight of a first UAV based on wind information obtained by a second UAV that flies near the first UAV during the flight of the first UAV and is configured to obtain the wind information about wind.

In one aspect of the present invention, the UAV control system further includes first position information obtaining means for obtaining first position information about a position of the first UAV, and second position information obtaining means for obtaining second position information about a position of the second UAV. The flight control means controls the flight of the first UAV further based on the first position information and the second position information.

In one aspect of the present invention, the flight control means controls the flight of the first UAV based on the wind information when the second UAV is on a windward side of the first UAV.

In one aspect of the present invention, the wind information includes information about a wind direction, and the flight control means controls the flight of the first UAV based on the wind direction indicated by the wind information and a direction between a position indicated by the first position information and a position indicated by the second position information.

In one aspect of the present invention, the second UAV includes sending means that does not send the wind information in a case where a change in the wind information is less than a threshold value and sends the wind information in a case where a change in the wind information is equal to or more than the threshold value, and the flight control means controls the flight of the first UAV based on the wind information that is sent when a change in the wind information is equal to or more than the threshold value.

In one aspect of the present invention, the first UAV flies based on one of a plurality of flight modes, and the flight control means switches the flight modes of the first UAV based on the wind information.

In one aspect of the present invention, the UAV control system further includes external force estimation means for estimating an external force on the first UAV based on the wind information, and the flight control means controls the flight of the first UAV based on a result of estimation of the external force estimation means.

In one aspect of the present invention, the flight control means controls the flight of the first UAV based on a direction of the external force indicated by the result of estimation of the external force estimation means.

In one aspect of the present invention, the UAV control system further includes statistics information obtaining means for obtaining statistics information about wind in an area where the first UAV flies, and the flight control means controls flight of the second UAV further based on the statistics information.

In one aspect of the present invention, the UAV control system further includes wind estimation means for estimating future wind in an area where the first UAV flies based on the wind information, and the flight control means controls the flight of the first UAV based on a result of estimation of the wind estimation means.

Effects of the Invention

According to one or more embodiments of the present invention, it is possible to reduce delay in flight control in response to changes in wind.

DESCRIPTION OF EMBODIMENTS

[1. Overall Configuration of Unmanned Aerial Vehicle Control System]

Figure 1:
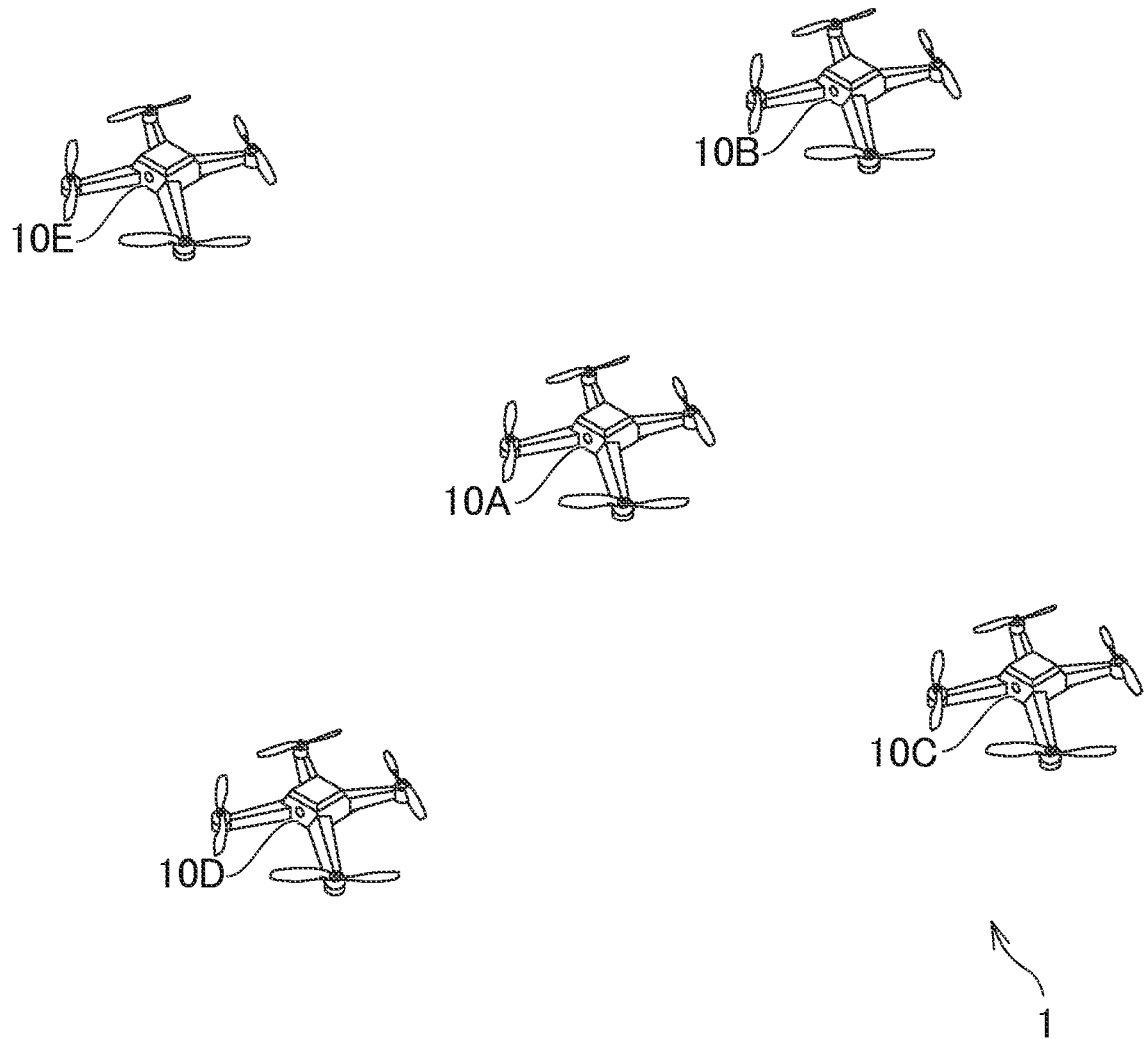
FIG. 1 is a diagram illustrating an overall configuration of an unmanned aerial vehicle (UAV) control system.

An example of an embodiment of the unmanned aerial vehicle (UAV) control system according to the present invention will be described below. FIG. 1 is a diagram illustrating an overall configuration of the UAV control system. As shown in FIG. 1, the UAV control system 1 of this embodiment includes UAVs 10A to 10E. In the following, when there is no particular need to distinguish among the UAVs 10A to 10E, they are each referred to as a UAV 10.

The UAV 10 is an aircraft on which a person does not board, such as a UAV driven by a battery (what is called "drone") and a UAV driven by an engine. For example, the UAV 10 may carry a load such as goods or letters, and flies to a delivery address to deliver a package, or to a pickup address to collect a package. For example, the UAV 10 may fly not particularly for carrying a package, but for obtaining information of a flight destination. For example, the UAV 10 may fly not particularly for carrying a package or obtaining information of a flight destination, but for obtaining wind information described later.

The UAV control system 1 may include a plurality of UAVs 10, and the number of UAVs is not limited to five as illustrated in FIG. 1. For example, the number of UAVs included in the UAV control system 1 may be two, three, four, or six or more.

Figure 2:
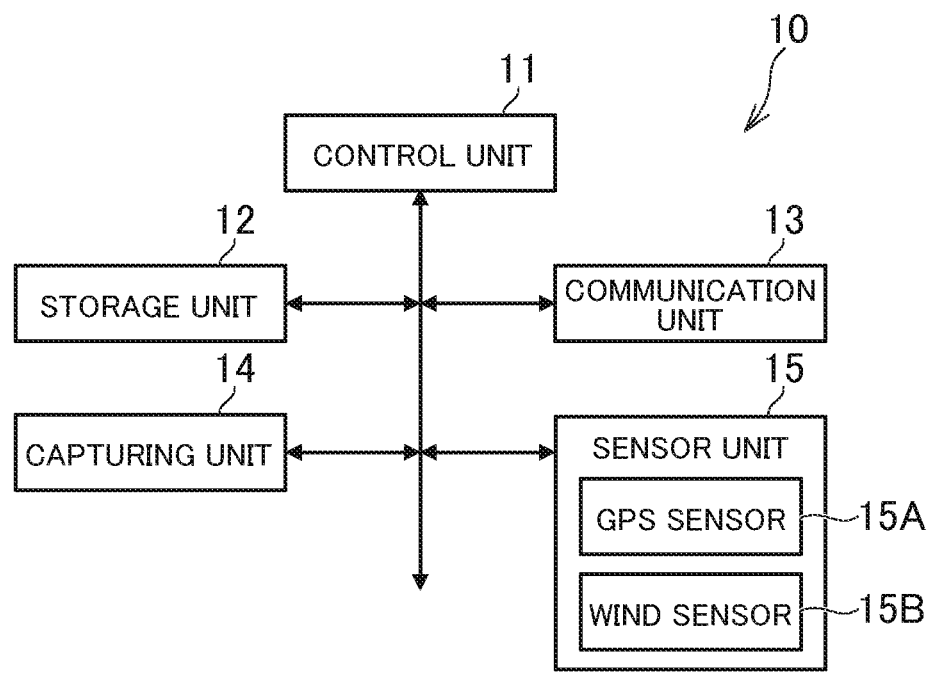
FIG. 2 is a diagram illustrating a hardware configuration of a UAV.

FIG. 2 is a diagram illustrating a hardware configuration of the UAV 10. As shown in FIG. 2, the UAV 10 includes a control unit 11, a storage unit 12, a communication unit 13, a capturing unit 14, and a sensor unit 15. The UAV 10 also includes, for example, propellers, a motor, and a battery, which are omitted here. In this embodiment, each UAV 10 has the same hardware configuration as the other UAVs 10, although may have a hardware configuration different from the other UAVs 10.

The control unit 11 includes, for example, at least one microprocessor. The control unit 11 executes processing in accordance with programs and data stored in the storage unit 12. The storage unit 12 includes a main storage unit and an auxiliary storage unit. For example, the main storage unit is a volatile memory such as a RAM, and the auxiliary storage unit is a nonvolatile memory such as a hard disk and a flash memory. The communication unit 13 includes a wired or wireless communication interface. The communication unit 13 sends and receives data through a network. The capturing unit 14 is a camera. The capturing unit 14 includes an image pickup element, such as, a CMOS image sensor and a CCD image sensor, and stores images captured by the image pickup element as digital data.

The sensor unit 15 includes, for example, a GPS sensor 15A and a wind sensor 15B. The GPS sensor 15A includes a receiver for receiving a signal from a satellite, and detects position information based on the signal received by the receiver, for example. The wind sensor 15B is a digital anemometer (electronic anemometer). For example, the wind sensor 15B includes a temperature sensor and a pressure sensor, and detects changes in temperature and pressure due to wind, thereby detecting wind information described later. The UAV 10 may include any sensor, and the sensor unit 15 may include any sensor, such as, an infrared ray sensor, an audio sensor (microphone), an acceleration sensor, a gyro sensor, a magnetic field sensor, an altitude sensor, a displacement sensor, and a temperature sensor.

The hardware configuration of the UAV 10 is not limited to the example of FIG. 2, but various types of hardware may be employed. For example, the UAV 10 may include an input device, such as a touch panel and a button, and a liquid crystal display or an organic EL display. For example, the UAV 10 may include a reader (e.g., memory card slot, optical disc drive) for reading a computer-readable information storage medium, and an input/output unit (e.g., USB port) for communicating with external devices. The programs and data described as being stored in the storage unit 12 may be provided through the reader or the input/output unit, or a network.

In the UAV control system 1 according to this embodiment, when a change in wind information detected by the wind sensor 15B is large, a UAV 10 sends the wind information to the other UAVs 10. When a UAV 10 receives wind information from another UAV 10, the UAV 10 switches flight modes so as to stabilize its attitude in preparation for the wind that the UAV 10 will receive, thereby reducing delay in flight control in response to changes in wind. The details of the technique will be described below.

[2. Functions Implemented in UAV Control System]

Figure 3:
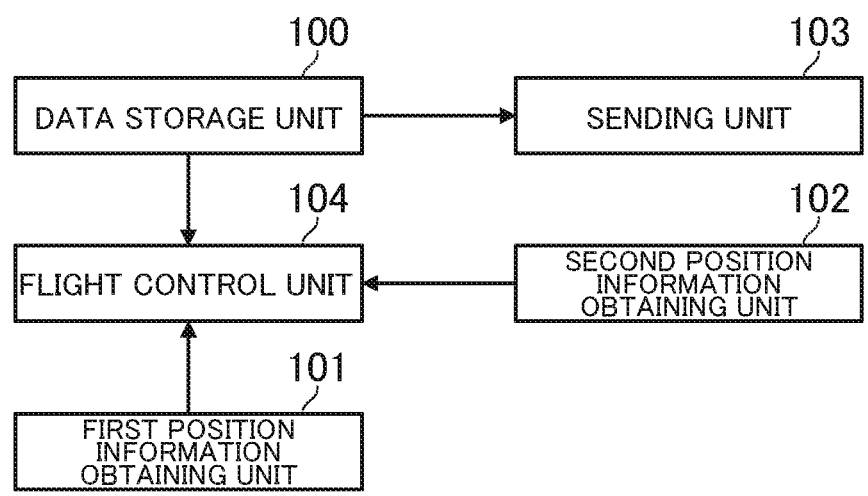
FIG. 3 is a functional block diagram showing an example of functions implemented in the UAV control system.

FIG. 3 is a functional block diagram showing an example of functions implemented in the UAV control system 1. As shown in FIG. 3, the UAV control system 1 implements a data storage unit 100, a first position information obtaining unit 101, a second position information obtaining unit 102, a sending unit 103, and a flight control unit 104. In this embodiment, a case will be described in which these functions are implemented in each UAV 10.

[2-1. Data Storage Unit]

The data storage unit 100 is implemented mainly by the storage unit 12. The data storage unit 100 stores data necessary for flight control of the UAV 10. For example, the data storage unit 100 stores flight control data indicating relationship between wind information and flight control methods. The flight control data will be described in detail.

For example, if the UAV 10 automatically flies based on a predetermined flight route, the data storage unit 100 may store data relating to the flight route. In this case, the UAV 10 compares position information of the UAV 10 detected by the GPS sensor 15A with the flight route, and controls its flight so as to keep the difference between them less than a threshold value.

For example, the data storage unit 100 may store map data of an area where the UAV 10 flies. For example, the data storage unit 100 may store history of the position information of its UAV 10, or history of position information of the other UAVs 10. For example, the data storage unit 100 may store history of the position information of its UAV 10, or history of position information of the other UAVs 10. For example, the data storage unit 100 may store a threshold value as a criterion for determining whether to send wind information to the other UAVs.

[2-2. First Position Information Obtaining Unit]

The first position information obtaining unit 101 is implemented mainly by the control unit 11. The first position information obtaining unit 101 obtains first position information relating to a position of a first UAV.

The first UAV is a UAV 10 to be controlled by a flight control unit 104. The number of the first UAV may be one, or two or more. In this embodiment, the flight of a UAV 10 is not controlled by external computers, but controlled by the UAV 10 itself, and thus the first position information is position information of the UAV 10. As such, in the embodiment, the description of "its UAV" may be replaced with "first UAV", and "position information of its UAV" may be replaced with "first position information."

In this embodiment, a case will be described in which latitude/longitude information detected by the GPS sensor 15A is used as the position information, although the position information may be any information that can specify a position. For example, the position information may be indicated by a type of a communication device at an access point of wireless LAN, a type of abase radio station, or a relative position obtained by wireless communications having directivity. This applies not only to the first position information but also to second position information described later.

For example, the first position information obtaining unit 101 obtains first position information based on a received signal of the GPS sensor 15A. For example, the first position information obtaining unit 101 may obtain the first position information based on an image captured by the capturing unit 14. For example, the first position information obtaining unit 101 may obtain the first position information based on a detection signal detected by a sensor other than the GPS sensor 15A.

The first position information obtaining unit 101 may regularly or irregularly obtain the first position information. For example, the first position information obtaining unit 101 may obtain the first position information for every predetermined frames (every time a predetermined period of time elapses), or obtain the first position information when a predetermined condition is satisfied, for example, when the wind information is received from another UAV 10.

[2-3. Second Position Information Obtaining Unit]

The second position information obtaining unit 102 is implemented mainly by the control unit 11. The second position information obtaining unit 102 obtains second position information relating to a position of a second UAV.

The second UAV is a UAV that flies near the first UAV in flight and can obtain information about wind. In other words, the second UAV is a UAV that detects wind information for controlling the flight of the first UAV. The number of the second UAV may be one, or two or more. The second UAV flies over an area in which the first UAV flies, and continues to fly while the first UAV flies.

The second UAV may fly with the first UAV (move with the first UAV), or fly independently regardless of the first UAV. The first UAV and the second UAV do not need to fly exactly the same path, although if they fly in totally different areas, the wind information of the second UAV is not informative. As such, the second UAV flies near the first UAV, for example. For example, the second UAV flies within a predetermined distance from the first UAV, or flies on a flight path within a predetermined difference from the flight path of the first UAV. The predetermined distance may be about several meters to several hundreds of meters, for example.

The positional relationship between the first UAV and the second UAV may be freely determined. For example, the second UAV may fly at any position with respect to the first UAV, such as, positions in front of, behind, on the right or the left of, above, or below the first UAV. For example, other objects may exist between the first UAV and the second UAV. For example, objects such as a building, utility pole, and an electric wire may exist, or another UAV may fly.

In this embodiment, a UAV 10 obtains wind information from another UAV to control its flight, and thus the second position information is position information of another UAV. In other words, the second position information is a position at which the wind information is obtained and the wind indicated by the wind information blows. In this embodiment, the description of "another UAV" can be replaced with "second UAV", and "position information of another UAV" can be replaced with "second position information."

For example, the second position information obtaining unit 102 obtains second position information based on the received signal of the GPS sensor 15A. For example, the second position information obtaining unit 102 may obtain the second position information based on an image captured by the capturing unit 14. For example, the second position information obtaining unit 102 may obtain the second position information based on a detection signal detected by a sensor other than the GPS sensor 15A.

The second position information obtaining unit 102 may regularly or irregularly obtain the second position information. For example, the second position information obtaining unit 102 may obtain the second position information for every predetermined frames (every time a predetermined period of time elapses), or obtain the second position information when a predetermined condition is satisfied, for example, when a change in wind information is a threshold value or more, or when the wind information is sent to another UAV.

[2-4. Sending Unit]

The sending unit 103 is implemented mainly by the control unit 11. The sending unit 103 sends wind information to external devices. The external devices include, for example, other UAVs and a server computer.

For example, the wind information includes information about at least one of wind strength and wind direction. In this embodiment, wind strength is indicated by wind speed, although it may be indicated by any index, such as wind power, wind pressure, and airflow. As such, in this embodiment, the description of "wind speed" can be replaced with indexes such as wind power, wind pressure, and airflow.

The wind strength is indicated by values directly representing wind speed itself, or by symbols indicating extent of wind speed. If the wind speed is represented by symbols, meaning of each symbol may be determined in advance, for example, A means windless, B means breeze, and C means strong wind. For example, the wind direction may be represented in a two-dimensional direction, or a three-dimensional direction, and is represented in a vector or a compass direction. The two-dimensional direction only includes a horizontal direction, and the three-dimensional direction includes not only a horizontal direction but a vertical direction. In a case where the wind direction is represented in a vector, a two-dimensional or three-dimensional vector may be used. In a case where the wind direction is represented in a compass direction, any method such as 360 degree system, 90 degree system, and dot pattern may be used.

For example, the sending unit 103 obtains wind speed and wind direction based on a detection signal of the wind sensor 15B, and sends the obtained wind speed and wind direction to the external devices as the wind information.

The wind information needs not to be detected by the wind sensor 15B, and the method of obtaining wind information may employ various known methods. When the wind information is obtained by other than the wind sensor 15B, the wind sensor 15B may be omitted. For example, the wind information may be detected based on changes in an image captured by the capturing unit 14. In this case, the wind information may be detected based on a difference between the modeled acceleration (e.g., acceleration in a windless state) and the acceleration that is determined based on changes in feature points obtained from the image. For example, the wind information may be detected by a sensor other than the wind sensor 15B. For example, the wind information may be detected based on a difference between the modeled acceleration and the acceleration obtained by the acceleration sensor.

The sending unit 103 may regularly or irregularly send wind information. For example, the sending unit 103 may send wind information for every frames (every time a predetermined period of time elapses), or when a predetermined condition is satisfied.

For example, the sending unit 103 may not send wind information if a change in the wind information is less than a threshold value, and may send the wind information if a change in the wind information is equal to or more than the threshold value. The change in the wind information is at least one of a change in wind speed and a change in wind direction. The threshold value may be a fixed value or a variable value. If the threshold value is a variable value, the threshold value may change depending on date and time, season, weather, and place of flight, or may be a value entered by a system administrator.

For example, the sending unit 103 specifies a change in the wind information based on the wind information at some points in time. A combination of some points in time may be any combination. For example, the sending unit 103 may specify a change in the wind information based on the latest wind information and the most recent wind information, or based on the wind information at three or more points in time.

The sending unit 103 determines whether a change in the wind information is equal to or more than a threshold value. For example, the sending unit 103 determines whether the amount of change in the wind speed is equal to or more than the threshold value, or whether the amount of change in the wind direction is equal to or more than the threshold value. The amount of change in the wind speed is increasing amount or decreasing amount of the wind speed per unit of time, and acceleration of the wind speed. The amount of change in the wind direction is a change in the wind direction per unit of time, and an angle by which the wind direction is changed. The sending unit 103 determines whether to send the wind information based on the determination result.

In a case where three or more UAVs 10 fly as in this embodiment, the sending unit 103 may send the wind information to all of the other UAVs, or only a part of UAVs. When sending the wind information to a part of the UAVs, the sending unit 103 may determine a UAV 10 to send the wind information based on the random or predetermined order, or may obtain position information of the other UAVs and determine a UAV 10 in the downwind side as a target to send the wind information. As another example, the sending unit 103 may send the wind information to another UAV 10 that flies ahead of its UAV in the movement direction or another UAV 10 that flies behind its UAV in the movement direction.

[2-5. Flight Control Unit]

The flight control unit 104 is implemented mainly by the control unit 11. The flight control unit 104 controls the flight of its UAV 10 (first UAV) based on the wind information obtained by another UAV 10 (second UAV). In this embodiment, UAVs 10 each control flight, and thus the flight control unit 104 obtains wind information sent from a sending unit 103 of another UAV 10, and controls flight of its UAV 10.

For example, the relationship between wind information and flight control methods is defined in the flight control data stored in the data storage unit 100. The flight control data may be in program format, or numerical or table format. That is, the relationship may be defined in a portion of a program code, or in a numerical format or a table format.

The flight control method is a method of controlling at least one of movement direction, movement velocity, and attitude of the UAV 10. The movement direction, movement velocity, and attitude of the UAV 10 are controllable by respective rotations of propellers of the UAV 10, and thus the flight control unit 104 controls the number of rotations and the direction of rotation of each propeller according to the flight control data. The number of rotations and the rotational direction of a propeller vary depending on a voltage to a motor that rotates the propeller and frequencies of an AC signal. As such, it can be described that the flight control unit 104 determines a voltage and an AC signal to each motor based on the flight control data.

For example, the flight control unit 104 controls flight of its UAV 10 based on the flight control method associated with the wind information. The flight control unit 104 may change flight control algorithm based on the wind information, or change only a coefficient used in the flight control algorithm.

The flight control algorithm is an algorithm for controlling the flight of the UAV 10, and, for example, defines the relationship between the current status of the UAV 10 and the flight control method. The current status indicates, for example, at least one of the UAV 10's current position, movement direction, movement velocity, and attitude.

For example, the flight control algorithm includes an automatic flight algorithm for flying on a predetermined flight path and an attitude control algorithm for keeping the attitude of the UAV 10 in a predetermined range. The automatic flight algorithm mainly controls the UAV 10's position, movement direction, and movement velocity, and the attitude control algorithm mainly controls the UAV 10's attitude.

Figure 4:
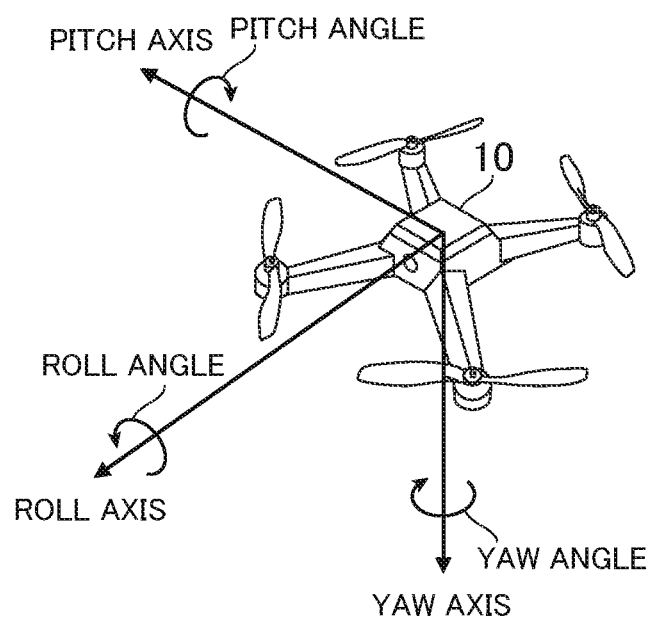
FIG. 4 is a diagram explaining an example of an attitude control algorithm.

FIG. 4 is a diagram explaining an example of the attitude control algorithm. As shown in FIG. 4, the attitude of the UAV 10 is defined by a roll angle, a pitch angle, and a yaw angle. The roll angle, the pitch angle, and the yaw angle may be obtained by a detection signal of a gyro sensor or an acceleration sensor installed in the sensor unit 15.

With the use of the attitude control algorithm, in a case where the attitude of the UAV 10 is changed, rotation of the propellers are controlled so as to reduce such change. Here, a case will be described in which the attitude control algorithm is defined so as to maintain the roll angle and the pitch angle of the UAV 10 in a predetermined range, although the attitude control algorithm may be defined so as to maintain the yaw angle in a predetermined range.

For example, when the UAV 10 is blown by wind, the UAV 10 will lose balance if the roll angle and the pitch angle are changed too much. As such, the attitude control algorithm controls the number of rotations of the propellers so as to reduce the changes in the roll angle and the pitch angle. For example, the UAV 10 rotates around the roll axis (front direction of the aircraft) of the UAV 10 as the rotation axis. If the roll angle increases, the attitude control algorithm increases the number of rotations of propeller in the rotation direction (left or right propeller) so as to reduce the roll angle, thereby restoring the attitude of the aircraft. Similarly, the UAV 10 rotates around the pitch axis (lateral direction of the aircraft) of the UAV 10 as the rotation axis. If the pitch angle increases, the attitude control algorithm increases the number of rotations of propeller in the rotation direction (front or rear propeller) so as to reduce the pitch angle, thereby restoring the attitude of the aircraft.

The flight control unit 104 controls the flight of the UAV 10 based on the flight control data described above. In this embodiment, the UAV 10 flies based on one of the flight modes, and the flight control data indicates the relationship between the wind information and the flight modes. The flight modes indicate content or coefficients of the flight control algorithms, and include, for example, a normal flight mode in which flying to a destination on a predetermined path is prioritized and an attitude-maintaining mode in which maintaining an attitude in preparation for wind is prioritized.

For example, the attitude control algorithm in the attitude-maintaining mode responds to wind (an external force) more quickly than the attitude control algorithm in the normal flight mode. Here, to respond means to control for restoring the changed attitude to the original attitude. For example, when using PID (Proportional-Integral-Differential) control for the attitude control algorithm, I value (coefficient of integral control to be used for eliminating a difference from the target value) of the attitude-maintaining mode may be smaller than I value of the normal flight mode so as to immediately restore the attitude when the attitude is changed. For example, P value (coefficient of proportional control to be used for operation in accordance with a difference from the target value) of the attitude-maintaining mode may be greater than P value of the normal flight mode. For example, D value (coefficient of differential control to be used for operation to reduce changes) of the attitude-maintaining mode may be greater than D value of the normal flight mode.

For example, the flight control unit 104 switches the flight modes of its UAV 10 based on the wind information. In this embodiment, each UAV 10 sends wind information to the other UAVs 10 when a change in the wind information is equal to or more than the threshold value. As such, if the wind information is received from another UAV 10, it means that the atmosphere around the UAV 10 is unstable. As such, upon receiving the wind information from another UAV 10, the flight control unit 104 sets the flight mode of its UAV 10 to the attitude-maintaining mode in preparation for influence of wind. "The atmosphere is unstable" means, for example, when a sudden gust of wind blows, wind suddenly stops, or wind direction changes suddenly.

The flight control unit 104 may change the flight control method during the unstable atmosphere. For example, an algorithm of the attitude-maintaining mode may be determined such that the flight control method changes as the time elapses when the atmosphere is unstable. For example, the flight control unit 104 may use different flight control methods when the wind starts to blow and when the wind stops blowing. As in this embodiment, in a case where each UAV 10 sends wind information to the other UAVs 10 when the wind information is changed by the threshold value or more, the flight control unit 104 determines that wind starts to blow at the time when the wind information is received or a predetermined time has passed since the receiving time of the wind information, and determines that the wind stops blowing after a predetermined time has passed since the wind starts to blow. As another example, in a case where the UAVs 10 regularly send and receive wind information, the flight control unit 104 determines that wind starts to blow at the time when the wind information increases by a threshold value or more, and determines that the wind stops blowing at the time when the wind information decreases by the threshold value or more. For example, the flight control unit 104 may set at least one of the P value and the D value relatively greater at the time when the wind starts to blow, and may set at least one of the P value and the D value relatively smaller at the time when the wind stops blowing so as to prevent overshoots. For example, the flight control unit 104 may set the I value relatively smaller at the time when the wind starts to blow, and may set the I value relatively greater at the time when the wind stops blowing.

On the other hand, if a UAV 10 has not received wind information from another UAV for a predetermined period of time, which means surrounding atmosphere is stable. As such, when a UAV 10 has not received wind information from another UAV 10 for a predetermined period of time, the flight control unit 104 of the UAV sets a flight mode to the normal flight mode so as to prioritize the flight to the destination. For example, the flight control unit 104 may perform flight control by slow control that does not easily diverge with a small P value. "The atmosphere is stable" means, for example, when a sudden gust of wind does not blow, wind does not suddenly stop, or wind direction does not change suddenly.

The flight control unit 104 may perform flight control without considering the positional relationship of the UAVs 10, although in this embodiment, flight control is performed in view of the positional relationship of the UAVs 10. Here, the positional relationship means a position of a UAV 10 relative to a position of another UAV 10. The flight control unit 104 controls flight of its UAV 10 based on the first position information (position information of its UAV 10) and the second position information (position information of another UAV 10).

For example, the flight control unit 104 may determine, based on the first position information and the second position information, whether to perform flight control on the basis of the wind information. For example, the flight control unit 104 determines whether the second position information (position information of another UAV 10) is on the windward side of the first position information (position information of its UAV 10). For example, the flight control unit 104 determines that the position is on the windward side if an angle between a direction from the second position information to the first position information and a wind direction indicated by the wind information is less than a predetermined angle (e.g., about 60° to 90°), and determines that the position is not on the windward side if the angle is equal to or more than the predetermined angle.

For example, if it is determined that the second position information is on the windward side of the first position information, the flight control unit 104 performs flight control based on wind information of another UAV 10, and if it is not determined that the second position information is on the windward side of the first position information, the flight control unit 104 does not perform flight control based on wind information of another UAV 10. That is, if another UAV 10 is on the downwind side, the flight control unit 104 performs flight control without considering the wind information received from the another UAV 10, and if another UAV 10 is on the windward side, the flight control unit 104 performs flight control considering the wind information received from the another UAV 10.

Figure 5:
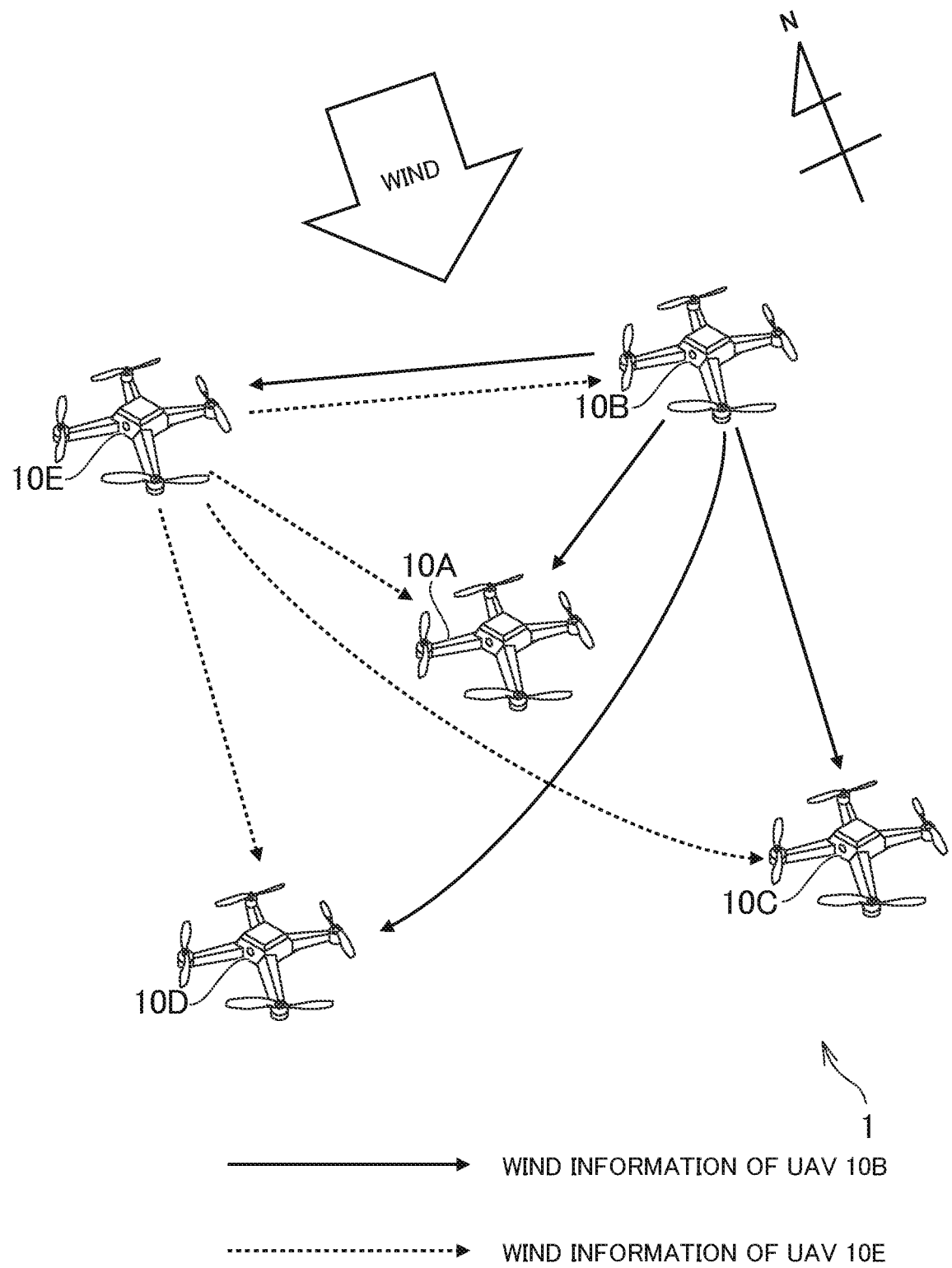
FIG. 5 is a diagram illustrating processing of a flight control unit.

FIG. 5 is a diagram illustrating the processing of the flight control unit 104. The example of FIG. 5 illustrates a case in which a gust of north wind (wind that blows from north to south) blows, and the UAVs 10B and 10E fly on the windward side (north side), the UAVs 10C and 10D fly on the downwind side (south side), and the UAV 10A flies therebetween.

In the case of FIG. 5, the UAVs 10B and 10E on the windward side detect changes in the wind information, and send data sets of their position information and wind information to the other UAVs. On the other hand, the UAVs 10A, 10C, and 10D on the downwind side have not detected changes in the wind information, and have not sent data sets to the other UAVs 10.

For example, upon receiving the data sets from the UAVs 10B and 10E, each of the UAVs 10A, 10C, and 10D determines whether the UAVs 10B and 10E are on the windward side. Here, it is determined that the UAVs 10B and 10E are on the windward side, and thus the UAVs 10A, 10C, and 10D perform their flight control based on the received wind information. In other words, the UAVs 10A, 10C, and 10D switch to the attitude-maintaining mode in preparation for the north wind to be received.

Upon receiving the data set from the UAV 10E, the UAV 10B determines whether the UAV 10E is on the windward side. Here, the UAV 10E is on the west side of the UAV 10B, and thus the UAV 10E is not determined to be on the windward side. As such, the UAV 10B does not particularly consider the wind information received from the UAV 10E. In this case, the UAV 10B may continue to fly in the normal flight mode, or switch to the attitude-maintaining mode based on the wind information that the UAV 10B has obtained.

Similarly, upon receiving the data set from the UAV 10B, the UAV 10E determines whether the UAV 10B is on the windward side. Here, the UAV 10B is on the east side of the UAV 10E, and thus the UAV 10B is not determined to be on the windward side. As such, the UAV 10E does not particularly consider the wind information received from the UAV 10B. In this case, the UAV 10E may continue to fly in the normal flight mode, or switch to the attitude-maintaining mode based on the wind information that the UAV 10E has obtained.

As described above, in this embodiment, the flight control unit 104 of a UAV 10 controls flight of the UAV 10 based on the wind information when another UAV 10 is on the windward side of the UAV 10. In this embodiment, the wind information includes information relating to the wind direction, and thus the flight control unit 104 of a UAV 10 controls its flight based on a wind direction indicated by the wind information and a direction between the position indicated by the first position information and the position indicated by the second position information. Further, in this embodiment, the sending unit 103 of another UAV 10 sends wind information when changes in the wind information are equal to or more than the threshold value, and thus the flight control unit 104 of a UAV 10 controls its flight based on the wind information that is sent when the changes in the wind information are equal to or more than the threshold value.

The flight control unit 104 may perform flight control such that a UAV 10 does not lose balance or fall due to wind, and the flight control method is not limited to switching flight modes as described above. For example, the flight control data may be defined so as to counteract wind indicated by the wind information. "The UAV 10 counteracts wind" means, for example, to take an attitude directed to the windward side, to move toward the windward side, or to make the number of rotations of propellers on the windward side less than the number of rotations of propellers on the downwind side. As another example, the flight control data may be defined such that the UAV 10 moves slower when the wind speed indicated by the wind information is faster, and the UAV 10 moves faster when the wind speed indicated by the wind information is slower. "Wind speed is fast" means the wind is strong, and "wind speed is slow" means the wind is weak.

[3. Processing Executed in UAV Control System]

Figure 6:
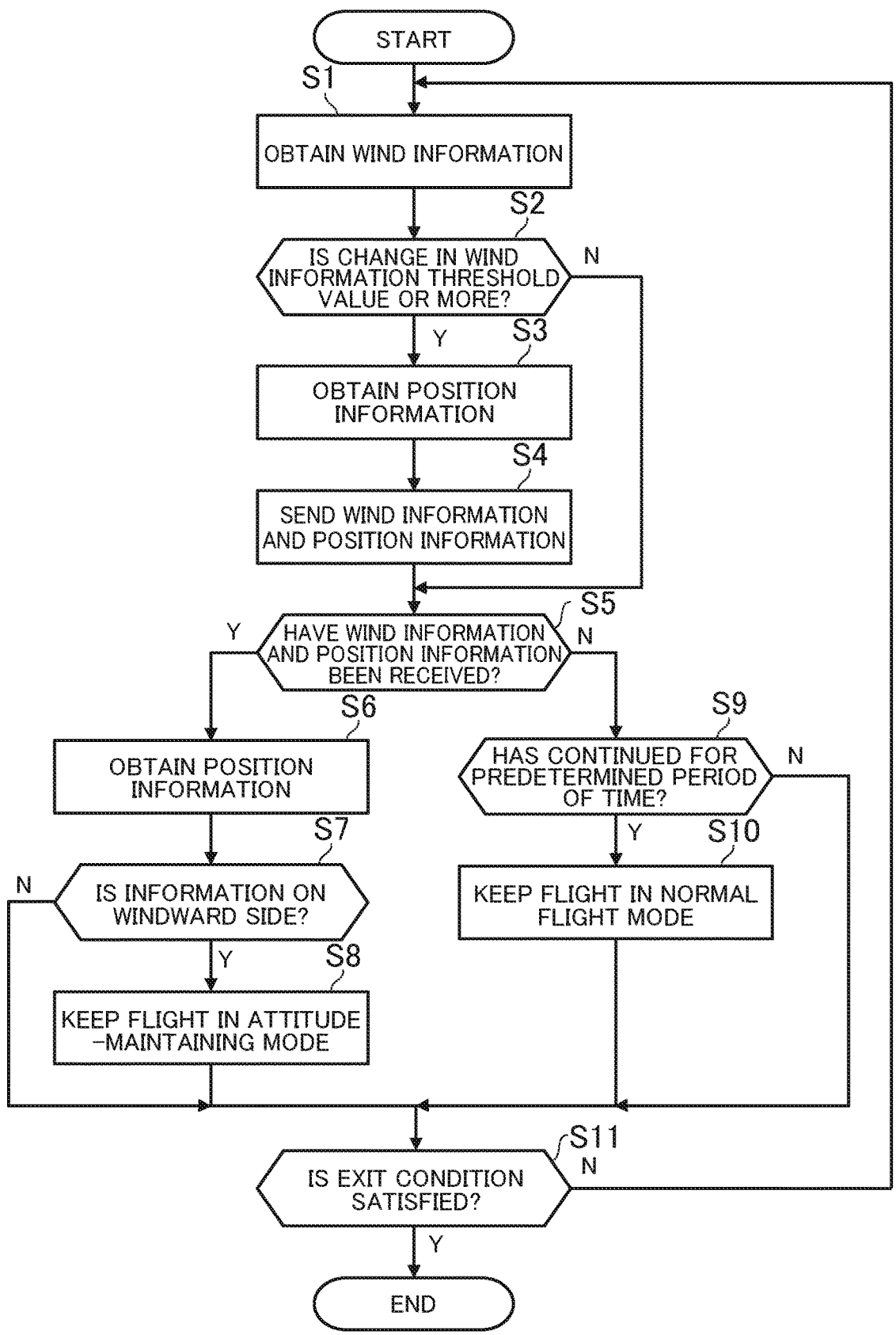
FIG. 6 is a flow chart showing an example of processing executed in the UAV control system.

FIG. 6 is a flow chart showing an example of processing executed in the UAV control system 1. In this embodiment, a case will be described in which each UAV 10 executes the processing shown in FIG. 6. For example, the processing shown in FIG. 6 is executed when the control unit 11 operates in accordance with the program stored in the storage unit 12. The processing described below is an example of the processing executed by the functional block shown in FIG. 3. The UAVs 10 are communicatively coupled to one another in advance.

As shown in FIG. 6, the control unit 11 obtains wind information based on a detection signal from the wind sensor 15B (S1). In S1, the control unit 11 obtains the wind speed and the wind direction detected by the wind sensor 15B as the wind information, and stores the wind information in the storage unit 12. The wind information may be stored in the storage unit 12 on a time-series basis, or stored in the storage unit 12 in association with the current time (the time at which wind information is obtained). Each UAV 10 knows accurate time based on, for example, a signal received by the GPS sensor 15A.

The control unit 11 determines whether a change in the wind information is equal to or more than a threshold value (S2). In S2, the control unit 11 specifies a change in the wind information based on the most recent wind information and the latest wind information. For example, the control unit 11 determines whether a difference between the wind speed indicated by the most recent wind information and the wind speed indicated by the latest wind information is equal to or more than a threshold value, and determines whether an angle between the wind direction indicated by the most recent wind information and the wind direction indicated by the latest wind information is equal to or more than a threshold value.

If it is determined that the change in the wind information is equal to or more than the threshold value (S2;Y), the control unit 11 obtains position information based on the received signal of the GPS sensor 15A (S3). The control unit 11 sends the data set of the wind information and the position information obtained in S1 to another UAV 10 (S4). In S4, the control unit 11 may directly send the wind information and the position information to another UAV 10 using wireless communications such as near field communications, or may indirectly send the wind information and the position information through a server computer, for example.

On the other hand, if it is determined that the change in the wind information is less than the threshold value in S2 (S2;N), the processing of S3 and S4 is not performed. In this case, the control unit 11 does not send a data set of the wind information and the position information to another UAV 10.

The control unit 11 determines whether the data set of the wind information and the position information is received from another UAV 10 (S5). In this embodiment, each UAV 10 executes such processing, and thus, the control unit 11 determines whether the data set of the wind information and the position information sent in the processing of S4 executed in another UAV 10.

If it is determined that the data set of the wind information and the position information is received (S5;Y), the control unit 11 obtains position information of its UAV 10 based on the received signal of the GPS sensor 15A (S6). In S6, the control unit 11 obtains the position information indicating the current portion of its UAV 10. The control unit 11 may store the data set of the wind information and the position information received in S5 in the storage unit 12. Such data set may be stored in the storage unit 12 on a time-series basis, or stored in the storage unit 12 in association with the current time (the time at which wind information is obtained).

The control unit 11 determines whether the wind information received in S5 is information on the windward side based on the position information of another UAV 10 received in S5 and the position information of its UAV 10 obtained in S6 (S7). In S7, the control unit 11 determines whether an angle between the direction from the position of another UAV 10 to the position of its UAV 10 and the wind direction indicated by the wind information is equal to or more than a predetermined angle (e.g., about 60° to 90°).

If it is determined that the wind information is information on the windward side (S7;Y), the control unit 11 controls its UAV 10 to fly in the attitude-maintaining mode (S8). In S8, the control unit 11 switches the flight mode of its UAV 10 from the normal flight mode to the attitude-maintaining mode. Subsequently, the UAV 10 controls the flight based on the attitude-maintaining mode, and more quickly responds to an external force (wind). That is, in response to a change in the attitude detected by a gyro sensor or an acceleration sensor, the UAV 10 expedites control for restoring the attitude.

On the other hand, in S5, if it is not determined that the data set of the wind information and the position information is received (S5;N), the control unit 11 determines whether a status in which the data set of the wind information and the position information has not been received continues for a predetermined period of time (S9). In S9, the control unit 11 determines whether a data set has not been received for a predetermined period of time (e.g., about several to several tens of seconds) since the time associated with the data set received most recently. The predetermined period of time may be a fixed value or a variable value. The predetermined period of time may vary depending on date and time, season, weather, and place of flight, or may be a value entered by a system administrator.

If it is determined that a data set of the wind information and the position information has not been received for the predetermined period of time (S9;Y), the control unit 11 controls its UAV 10 to fly in the normal flight mode (S10). In S10, the control unit 11 switches the flight mode of its UAV 10 from the attitude-maintaining mode to the normal flight mode. Subsequently, the UAV 10 controls the flight based on the normal flight mode, and prioritizes flying to a destination.

The control unit 11 determines whether a predetermined exit condition is satisfied (S11). The exit condition may be any condition determined for terminating this processing, such as, a condition that a UAV 10 arrives at a destination, or a condition that a UAV 10 makes a landing. If it is not determined that the exit condition is satisfied (S10;N), the processing returns to S1. If it is determined that the exit condition is satisfied (S10;Y), the processing terminates.

According to the UAV control system 1 described above, a UAV 10 controls its flight based on wind information detected by another UAV 10, and thus, can control its flight before exposing itself to the wind. As such, it is possible to reduce delay in flight control in response to changes in the wind. Safety of flight can be increased by reducing delay in flight control. For example, even though a UAV 10 is much lighter than a passenger airplane and tends to be flapped by wind, it is possible to reduce possibility that the UAV 10 loses balance or falls. For example, influence of wind is greatly different depending on positions in atmosphere, and in many cases, small difference in positions greatly changes influence of wind. As such, an anemometer on the ground can obtain rough wind information about the flight position of the UAV 10, but cannot obtain pinpoint wind information. In this regard, while it is difficult to dispose an anemometer on a flight path of a UAV 10, the UAV 10 can use pinpoint wind information detected by another UAV 10 flying ahead, thereby effectively reducing delay in flight control and increasing stability of flight.

In a case where each UAV 10 controls its flight based not only on wind information but also on first position information and second position information, accuracy of flight control can be increased. As such, it is possible to more effectively reduce delay in flight control in response to changes in wind.

In a case where each UAV 10 controls its flight based not on wind information of all of the UAVs 10 but on wind information of another UAV 10 on the windward side, accuracy of flight control can be increased. As such, it is possible to more effectively reduce delay in flight control in response to changes in wind.

In a case where each UAV 10 controls its flight based on a wind direction indicated by wind information and a direction between first position information and second position information, accuracy of flight control can be increased. As such, it is possible to more effectively reduce delay in flight control in response to changes in wind.

Each UAV 10 sends wind information to another UAV 10 when a change in the wind information is large. This eliminates the need of exchanging unnecessary wind information, thereby reducing traffic and processing load of all the UAV control system 1. Further, it is possible to speed up the processing speed of the UAV control system 1, and effectively increase safety of flight.

Each UAV 10 switches flight modes based on wind information, thereby simplifying the flight control processing. This can reduce the processing load of all the UAV control system 1 and speed up the processing speed of the UAV control system 1, and thereby effectively increasing safety of the flight.

[4. Variations]

The present invention is not to be limited to the above described embodiment. The present invention can be changed as appropriate without departing from the spirit of the invention.

Figure 7:
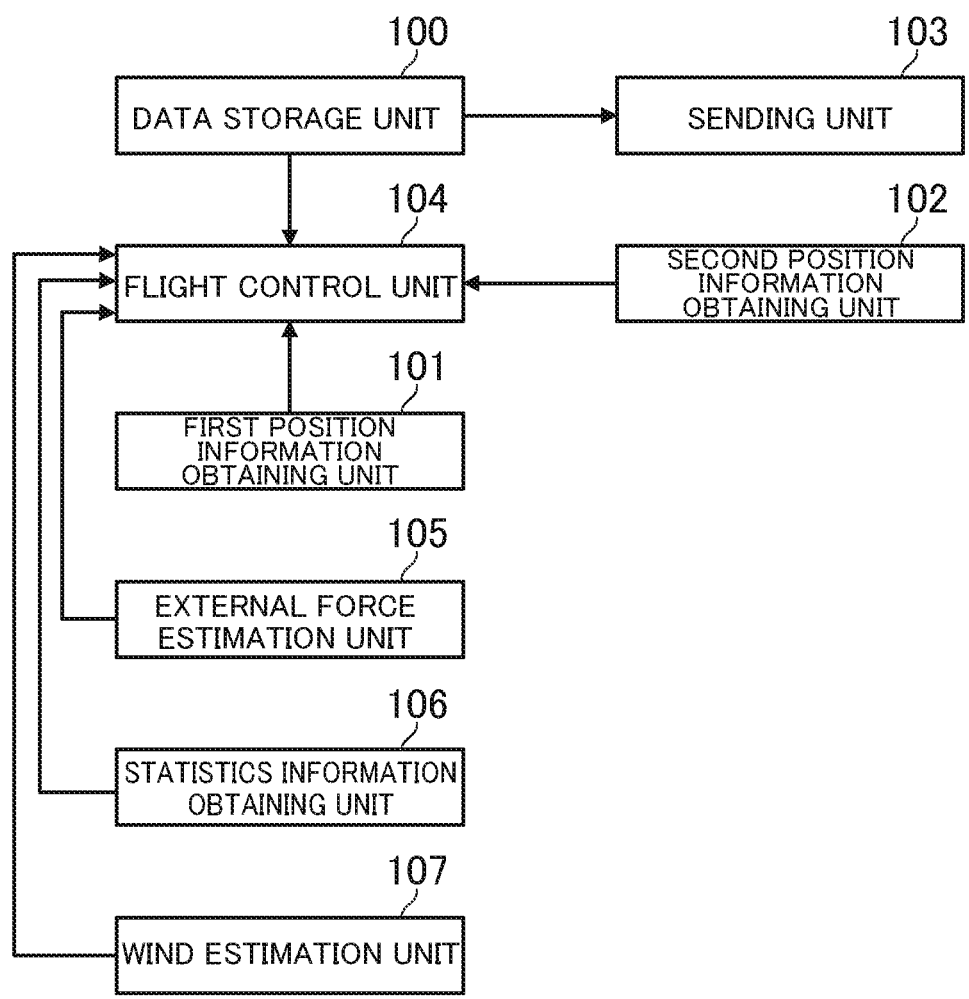
FIG. 7 is a functional block diagram of a variation.

FIG. 7 is a functional block diagram of a variation. As shown in FIG. 7, in the variation, an external force estimation unit 105, a statistics information obtaining unit 106, and a wind estimation unit 107 are implemented in addition to the functions described in the embodiment. These functions are implemented mainly by the control unit 31.

(1) For example, the UAV control system 1 may estimate an external force acting on each UAV 10 based on the wind information, and perform flight control based on the result of estimation of the external force. The UAV control system 1 of the variation (1) includes the external force estimation unit 105. The external force estimation unit 105 estimates an external force acting on its UAV 10 based on the wind information. The external force may be represented by a vector or by a combination of a compass direction and force. The external force may be represented by a two-dimensional direction or by a three-dimensional direction.

The relationship between wind information and an external force may be previously defined in external force estimation data stored in the data storage unit 100. The external force estimation data may be data in program format, or numerical or table format. That is, such relationship may be defined in a portion of a program code, or in a numerical format or a table format.

For example, in the external force estimation data, the external force is defined as being stronger when wind indicated by wind information is stronger. For example, the external force estimation data defines that the external force is exerted on the wind direction indicated by the wind information. The external force estimation data may be determined according to a shape of a UAV 10. For example, the external force estimation data may be determined such that a larger surface area of a UAV 10 is associated with a stronger external force, or an external force is exerted in a direction obtained by changing a wind direction, which is indicated by wind information according to a shape of a UAV 10, by a predetermined angle. For example, the external force estimation unit 105 estimates an external force acting on its UAV 10 based on the external force associated with the wind information.

The flight control unit 104 controls flight of its UAV 10 based on the result of estimation of the external force estimation unit 105. The flight control data in this variation indicates relationship between the external force and the flight control methods. For example, the flight control unit 104 controls flight of its UAV 10 based on the flight control method associated with the external force. For example, similarly to the embodiment, the flight control unit 104 may set the flight mode to the attitude-maintaining mode when the external force estimated by the external force estimation unit 105 is equal to or more than the threshold value.

For example, the flight control unit 104 may control flight of its UAV 10 so as to counteract the external force estimated by the external force estimation unit 105. For example, the flight control unit 104 controls flight of its UAV 10 based on magnitude of the external force. For example, the flight control unit 104 determines the number of rotations of the propellers based on the magnitude of the external force indicated by the result of estimation of the external force estimation unit 105. For example, the flight control unit 104 increases the number of rotations of the propellers when the magnitude of the external force indicated by the result of estimation of the external force estimation unit 105 is greater.

For example, the flight control unit 104 controls flight of its UAV 10 based on the direction of the external force indicated by the result of estimation of the external force estimation unit 105. For example, the flight control unit 104 controls flight of its UAV 10 such that thrust in the direction opposite to the direction of the external force indicated by the result of estimation of the external force estimation unit 105 becomes greater. For example, the flight control unit 104 sets the number of rotations of propellers on the upstream side of the direction of the external force indicated by the result of estimation of the external force estimation unit 105 to be smaller than the number of rotations of propellers on the downstream side, thereby tilting the vehicle body in the direction counteracting the external force.

According to the variation (1), accuracy of flight control can be increased by estimating an external force, and thus it is possible to effectively reduce delay in flight control in response to changes in wind.

In a case where flight is controlled based on a direction of an external force, accuracy of flight control can be increased, and thus it is possible to more effectively reduce delay in flight control in response to changes in wind.

(2) For example, the UAV control system 1 may consider not only the currently obtained wind information but also historical statistics information of the wind so as to control flight in more detailed manner. The UAV control system 1 of the variation (2) includes the statistics information obtaining unit 106. The statistics information obtaining unit 106 obtains statistics information about wind around the area where its UAV 10 flies.

The flight control unit 104 controls flight of its UAV 10 based further on the statistics information. The statistics information is historical wind information of the area where the UAV 10 flies and the nearby area (e.g., a range within several meters to several kilometers). The statistics information may indicate changes in wind at a certain point as statistics, or correlation between wind at a certain point and wind at another point as statistics. The statistics information may be generated based on wind information obtained by the UAV 10 in the past, wind information detected by an anemometer on the ground, or weather information provided by the public office or private companies.

For example, the flight control unit 104 estimates wind that its UAV 10 will receive based on the wind information and the statistics information. For example, if the statistics information indicates changes in the wind at a certain point, the flight control unit 104 estimates wind in the future based on the wind information. Further, for example, if the statistics information indicates the correlation between the wind at a certain point and the wind at another point as statistics, the flight control unit 104 estimates wind information at the position of its UAV 10 based on the wind information detected by another UAV 10.

The flight control unit 104 controls flight of its UAV 10 based on the result of estimation of the wind that its UAV 10 will receive, which is estimated as described above. For example, the flight control data indicates relationship between the result of estimation of the wind and the flight control methods. Such relationship defines the flight control methods so as to perform flight control in a way to counteract the estimated wind. For example, the flight control unit 104 controls flight of its UAV 10 based on the flight control method associated with the result of estimation of the wind. Other than using the result of estimation of the wind, the flight control method may be the same as the method as described in the embodiment.

For example, the flight control unit 104 controls flight of its UAV 10 based on the direction of the wind indicated by the result of estimation indicated by the wind estimation unit 107. For example, the flight control unit 104 controls flight of its UAV 10 such that thrust in the direction opposite to the direction of the wind indicated by the result of estimation of the wind estimation unit 107 becomes greater. For example, the flight control unit 104 sets the number of rotations of propellers on the upstream side of the direction of the wind indicated by the result of estimation of the external force estimation unit 105 to be smaller than the number of rotations of propellers on the downstream side.

According to the variation (2), accuracy of flight control can be increased by using statistics information, and thus it is possible to effectively reduce delay in flight control in response to changes in wind.

(3) For example, in addition to the currently obtained wind information, the UAV control system 1 may estimate wind at an area where the UAV 10 will fly so as to control flight in more detailed manner. The UAV control system 1 of the variation (3) includes the wind estimation unit 107. The wind estimation unit 107 estimates future wind in the area where its UAV 10 flies based on the wind information. The estimation of the wind may be at one point in the future, or time-series changes in a predetermined period of time.

The data storage unit 100 may previously store wind estimation data indicating the relationship between the wind information and the result of estimation of the wind. The wind estimation data may be data in program format, or numerical or table format. That is, such relationship may be defined in a portion of a program code, or in a numerical format or a table format. The wind estimation data may be generated based on wind information detected by the UAV 10 in the past, wind information detected by an anemometer on the ground, or weather information provided by the public office or private companies.

For example, the wind estimation data may define trends in changes in the wind information and the result of estimation of future wind. For example, the wind estimation data defines the result of estimation that, when the wind in a specific direction grows weak in several seconds, a sudden gust of wind blows in the opposite direction at the subsequent moment. For example, the wind estimation data defines the result of estimation that the wind in a specific direction continues for several seconds, then stops suddenly. For example, the external force estimation unit 105 obtains the result of estimation associated with the wind information.

The flight control unit 104 controls flight of its UAV 10 based on the result of estimation of the wind estimation unit 107. The flight control data in this variation indicates relationship between the result of estimation of the wind and the flight control methods. Such relationship defines the flight control methods so as to perform flight control in a way to counteract the estimated wind. For example, the flight control unit 104 controls flight of its UAV 10 based on the flight control method associated with the result of estimation of the wind. The flight control method based on the result of estimation may be the same as described in the variation (2).

According to the variation (3), accuracy of flight control can be increased by using the result of estimation of the wind, and thus it is possible to effectively reduce delay in flight control in response to changes in wind. For example, even though the thrust in the windward side is increased so as to counteract the sudden gust of wind, if the wind stops suddenly, the UAV 10 may be tilted by its reaction. Such reaction can be prevented by performing feedforward control based on the estimation of the wind.

(4) For example, two or more of the above described variations (1) to (3) may be combined.

For example, the flight control method in view of positional relationship between the UAVs 10 is not limited to the above example. For example, the flight control unit 104 may define the relationship between the positional relationship of the UAVs 10 and the flight control methods in the flight control data. In this case, the flight control unit 104 controls flight of its UAV 10 based on the flight control method associated with the positional relationship between the first position information and the second position information. For example, in a case where the UAV 10 is controlled so as to counteract the wind, the thrust of the UAVs 10 may be differentiated according to the positional relationship. For example, the UAV 10 may strongly counteract the wind in a case where another UAV 10 that detects the wind information is in the windward direction of the UAV 10, and may weakly counteract the wind in a case where another UAV 10 that detects the wind information is on a position slightly out of the windward direction of the UAV 10.

For example, the flight control method in view of wind direction is not limited to the above example. For example, relationship between the wind direction and the flight control method may be defined in the flight control data. In this case, the flight control unit 104 controls flight of its UAV 10 based on the flight control method associated with the wind direction indicated by the wind information. For example, in a case where the UAV 10 is controlled so as to counteract the wind, the thrust of the UAV 10 may be differentiated according to the wind direction and the movement direction. For example, the UAV 10 may weakly counteract the wind in a case where difference between the wind direction indicated by the wind information and the movement direction is small, because the UAV 10 is not so much flapped by wind left to right. The UAV 10 may strongly counteract the wind in a case where such difference is large, because the UAV 10 is highly likely flapped by wind left to right.

For example, in a case where a sending unit 103 of each UAV 10 sends wind information to another UAV 10 regardless of a change in the wind information, a flight control unit 104 may determine whether the change in the received wind information is equal to or more than a threshold value, and control flight of its UAV 10 based on the determination result.

For example, each UAV 10 may perform flight control without particularly considering the first position information and the second position information. In this case, each UAV 10 may unconditionally switch to the attitude-maintaining mode when receiving wind information from another UAV 10. For example, each UAV 10 may perform flight control without particularly considering the wind direction. In this case, each UAV 10 may unconditionally switch to the attitude-maintaining mode when receiving wind information from another UAV 10.

For example, the case has been described in which each UAV 10 controls each flight, a UAV 10 may control flight of another UAV 10. For example, among the UAVs 10A to 10E, the UAV 10A may control flight of the other UAVs 10B to 10E. In other words, the UAV 10A may serve as a master, and the UAVs 10B to 10E may serve as slaves. In this case, a flight control unit 104 may be implemented only in the UAV 10A. Not only one UAV 10 but a plurality of UAVs 10 may serve as masters.

For example, the UAVs 10 may not necessarily fly in line, but may fly separately in the front and the back of a building. For example, the UAVs 10 may not necessarily fly on the same flight path, but may fly on different flight paths. In this case, however, if the flight paths of the UAVs 10 are totally different from one another, wind information is not reliable. As such, the flight paths may partially overlap with each other, or a distance between the flight paths may be less than a predetermined distance (e.g., about several meters to several hundreds of meters).

For example, the wind information may not be about the wind speed and the wind direction, but may include only information for identifying whether the wind blows. In this case, when a UAV 10 receives wind information from another UAV 10, the wind speed and the wind direction cannot be specified, although the UAV 10 may unconditionally switch to the attitude-maintaining mode when receiving the wind information.

For example, a UAV 10 may not automatically fly on a predetermined path, but an operator may operate the UAV 10. In this case, the UAV 10 receives operational instructions from a controller or a terminal that the operator operates, and controls the number of rotations of propellers based on the operational instructions. In this manner, flight of a UAV 10 manually operated by an operator may be also controlled based on wind information obtained by another UAV 10.

For example, the UAV control system 1 may include a computer other than the UAVs 10, and flight of the UAVs 10 may be controlled by the computer.

Figure 8:
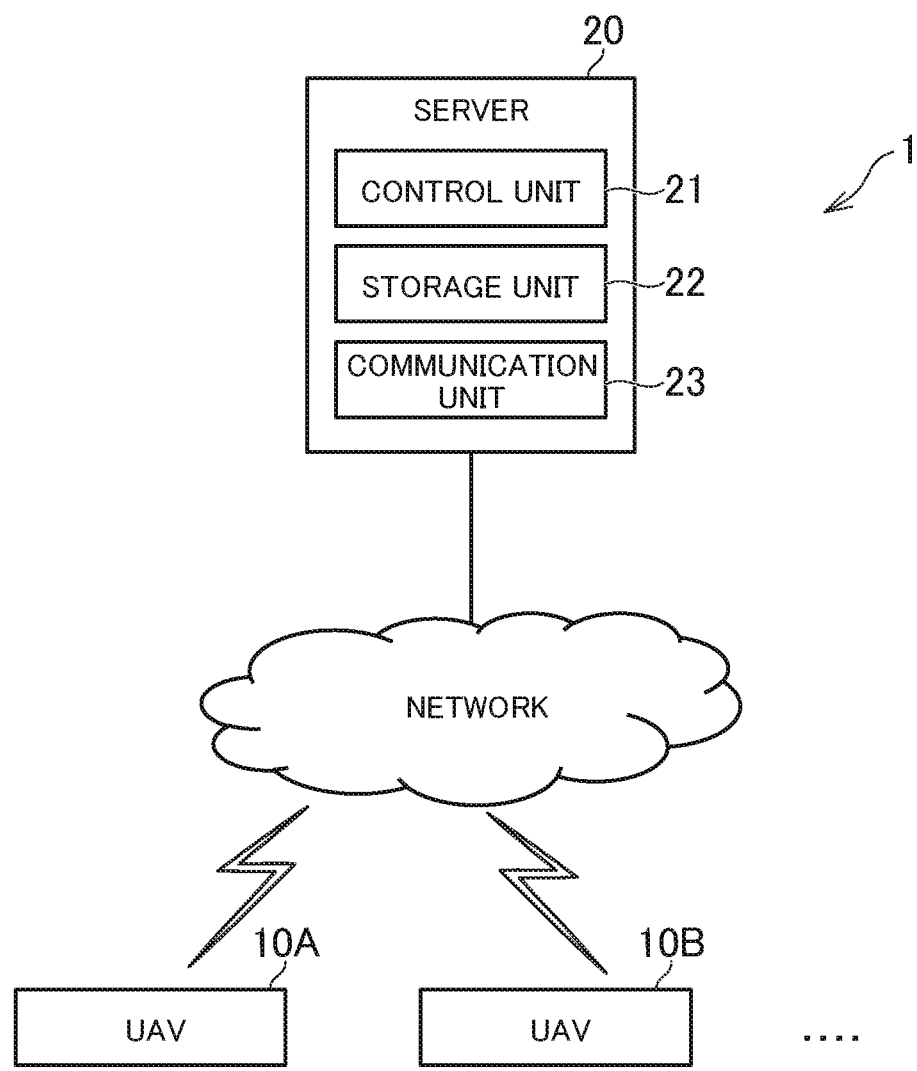
FIG. 8 is a diagram illustrating an overall configuration of the UAV control system according to the variation.

FIG. 8 is a diagram illustrating an overall configuration of the UAV control system. 1 according to a variation. As shown in FIG. 8, the UAV control system 1 includes a plurality of UAVs 10 and a server 20. The UAVs 10 and the server 20 are connected to a network, such as the Internet. The number of the server 20 may be one, or two or more.

The server 20 is a server computer and includes a control unit 21, a storage unit 22, and a communication unit 23. The hardware configurations of the control unit 21, the storage unit 22, and the communication unit 23 are the same as the hardware configurations of the control unit 11, the storage unit 12, and the communication unit 13, and thus descriptions thereof are omitted here.

The data storage unit 100 may be implemented mainly by the storage unit 22 of the server 20. In this case, each UAV 10 may obtain data stored in the data storage unit 100 of the server 20 through the network.

For example, the first position information obtaining unit 101 and the second position information obtaining unit 102 may be implemented mainly by the control unit 21 of the server 20. In this case, the server 20 obtains position information from each UAV 10.

For example, the flight control unit 104 may be implemented mainly by the control unit 21 of the server 20. In this case, the flight control unit 104 obtains wind information from a certain UAV 10, and controls flight of another UAV 10 based on the obtained wind information. The flight control method may be the same as the processing in the embodiment and the variations described above. The flight control unit 104 controls flight of a UAV 10 by sending the number of rotations of propellers to the UAV 10, for example. The UAV 10 changes the number of rotations of the propellers based on an instruction from the flight control unit 104 of the server 20.

The external force estimation unit 105 may be implemented mainly by the control unit 21 of the server 20. In this case, the external force estimation unit 105 obtains wind information from a certain UAV 10, and estimates an external force acting on another UAV 10 based on the obtained wind information. For example, the statistics information obtaining unit 106 may be implemented mainly by the control unit 21 of the server 20. In this case, the statistics information obtaining unit 106 obtains statistics information stored in the data storage unit 100, and estimates wind. For example, the wind estimation unit 107 may be implemented mainly by the control unit 21 of the server 20. In this case, the wind estimation unit 107 obtains the wind estimation data stored in the data storage unit 100, and estimates wind.

For example, the functions described above may be implemented in any of the computers in the UAV control system 1, and may be shared among the UAVs 10 and the server 20. Further, the functions described above may be omitted except the flight control unit 104.

The invention claimed is:

1. An unmanned aerial vehicle (UAV) control system comprising:
   a first UAV;
   a second UAV that flies near the first UAV during a flight of the first UAV and is configured to obtain present wind information; and
   at least one processor configured to:
      control the flight of the first UAV based on the wind present information obtained by the second UAV;
      obtain first position information about a position of the first UAV;
      obtain second position information about a position of the second UAV;
      control the flight of the first UAV further based on the first position information and the second position information; and
      control the flight of the first UAV based on the present wind information when the second UAV is on a windward side of the first UAV;
         wherein the windward side is upwind of the first UAV.

2. The UAV control system according to claim 1, wherein the present wind information includes information about a wind direction, and
   the at least one processor is configured to
      obtain a direction between a position indicated by the first position information and a position indicated by the second position information; and
      control the flight of the first UAV based on the wind direction indicated by the present wind information and the direction between the position indicated by the first position information and the position indicated by the second position information.

3. The UAV control system according to claim 1, wherein the second UAV does not send the present wind information in a case where a change in the present wind information is less than a threshold value and sends the present wind information in a case where a change in the present wind information is equal to or more than the threshold value, and
   the at least one processor is configured to control the flight of the first UAV based on the present wind information that is sent when a change in the present wind information is equal to or more than the threshold value.

4. The UAV control system according to claim 1, wherein the first UAV flies based on one of a plurality of flight modes, and
   the at least one processor is configured to switch the flight modes of the first UAV based on the present wind information.

5. The UAV control system according to claim 1, wherein at least one processor is configured to:
   estimate an external force on the first UAV based on the present wind information, and
   control the flight of the first UAV based on a result of the estimation.

6. The UAV control system according to claim 5, wherein the at least one processor is configured to control the flight of the first UAV based on a direction of the external force indicated by the result of the estimation.

7. The UAV control system according to claim 1, wherein the at least one processor is configured to:

obtain historical statistics information about wind in an area where the first UAV flies, and control the flight of the first UAV further based on the statistics information.

8. The UAV control system according to claim 1, wherein the at least one processor is configured to:

estimate future wind in an area where the first UAV flies based on historical wind information, and control the flight of the first UAV based on a result of the future wind estimation.

9. The UAV control system according to claim 1, wherein the at least one processor is configured to control the flight of the first UAV without considering the present wind information when the second UAV is on a downwind side of the first UAV.

10. A non-transitory computer-readable information storage medium for storing a program for causing a computer to control a flight of a first UAV based on present wind information obtained by a second UAV that flies near the first UAV during the flight of the first UAV and is configured to obtain the present wind information;

obtain first position information about a position of the first UAV;

obtain second position information about a position of the second UAV;

control the flight of the first UAV further based on the first position information and the second position information; and control the flight of the first UAV based on the present wind information when the second UAV is on a windward side of the first UAV;

wherein the windward side is upwind of the first UAV.

11. The UAV control system according to claim 1 further comprising a third UAV wherein the at least one processor configured to:

obtain third position information about a position of the third UAV; and control the flight of the first UAV further based on the first position information, the second position information, and the third position information.

12. The UAV control system according to claim 1, wherein the second UAV comprises a wind sensor that is configured to obtain the present wind information.

13. The UAV control system according to claim 1, comprising a third UAV that flies near the first UAV during a flight of the first UAV and is configured to obtain additional present wind information.

14. The UAV control system according to claim 1, wherein the present wind information indicates a wind direction that is obtained by the second UAV, the at least one processor is configured to determine that the second UAV is on the windward side if an angle between a direction from the second position information to the first position information and the wind direction indicated by the wind present information is less than a predetermined angle, and the at least one processor is configured to determine that the second UAV is not on the windward side if the angle is equal to or more than the predetermined angle.

15. A UAV control method comprising:

obtaining present wind information by a second UAV that flies near a first UAV during a flight of the first UAV and is configured to obtain about the present wind information; and controlling the flight of the first UAV based on the present wind information obtained in the present wind information obtaining step;

obtaining first position information about a position of the first UAV;

obtaining second position information about a position of the second UAV;

controlling the flight of the first UAV further based on the first position information and the second position information; and controlling the flight of the first UAV based on the present wind information when the second UAV is on a windward side of the first UAV;

wherein the windward side is upwind of the first UAV.

* * * * *